United States Patent
Hewitt et al.

(10) Patent No.: US 11,153,713 B2
(45) Date of Patent: Oct. 19, 2021

(54) PERFORMING DEVICE COMMUNICATIONS BASED ON RELATIVE POSITIONING

(71) Applicant: INTERNATIONAL BUSINESS MACHINES CORPORATION, Armonk, NY (US)

(72) Inventors: Trudy Leigh Hewitt, Cary, NC (US); Christina L. Wetli, Raleigh, NC (US); Francesco Carmine Schembari, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 15/699,308

(22) Filed: Sep. 8, 2017

(65) Prior Publication Data

US 2017/0374519 A1   Dec. 28, 2017

Related U.S. Application Data

(63) Continuation of application No. 13/870,626, filed on Apr. 25, 2013, now Pat. No. 9,820,098.

(51) Int. Cl.
*H04W 4/02* (2018.01)
*H04L 12/24* (2006.01)

(52) U.S. Cl.
CPC .......... *H04W 4/023* (2013.01); *H04L 41/12* (2013.01)

(58) Field of Classification Search
CPC .................................................. H04W 4/023
USPC ....................................................... 709/224
See application file for complete search history.

(56) References Cited

U.S. PATENT DOCUMENTS

| | | | |
|---|---|---|---|
| 6,742,037 B1 | 5/2004 | Hall et al. | |
| 7,724,705 B2 | 5/2010 | Erola et al. | |
| 8,166,411 B2 | 4/2012 | Zhang | |
| 8,219,028 B1 | 7/2012 | Flamholz | |
| 8,295,769 B2 | 10/2012 | Bloebaum | |
| 8,312,392 B2 | 11/2012 | Forutanpour et al. | |
| 2004/0203381 A1 | 10/2004 | Cahn et al. | |
| 2007/0165623 A1* | 7/2007 | Clark | H04L 67/24 370/389 |
| 2007/0185980 A1* | 8/2007 | Abraham | H04L 41/0816 709/222 |

(Continued)

OTHER PUBLICATIONS

Hazas, Mike, et al., "A Relative Positioning System for Co-Located Mobile Devices," In Proceedings of the 3rd International conference on Mobile Systems, applications, and services, pp. 177-190, ACM, 2005.

(Continued)

*Primary Examiner* — Vivek Srivastava
*Assistant Examiner* — Hien V Doan
(74) *Attorney, Agent, or Firm* — Christopher Pignato; Andrew M. Calderon; Roberts Calderon Safran & Cole. P.C.

(57) ABSTRACT

A method, system, and computer program product for initiating actions among devices are described. A relative position of at least one device to at least one other device is determined, and one or more rules specifying at least one action to initiate based at least in part on the relative position of the at least one device to the at least one other device are obtained. The one or more rules can differ based on the relative position of the devices. The at least one action is initiated using a processor of the at least one device.

18 Claims, 7 Drawing Sheets

(56) References Cited

U.S. PATENT DOCUMENTS

| | | | |
|---|---|---|---|
| 2009/0031258 A1 | 1/2009 | Arrasvuori et al. | |
| 2009/0143056 A1 | 6/2009 | Tang et al. | |
| 2009/0325593 A1* | 12/2009 | Do | H04M 1/72572 455/456.1 |
| 2010/0169429 A1* | 7/2010 | O'Sullivan | G06Q 10/107 709/206 |
| 2011/0283334 A1* | 11/2011 | Choi | G06F 3/04883 725/148 |
| 2012/0220221 A1 | 8/2012 | Moosavi et al. | |
| 2012/0220266 A1* | 8/2012 | Lau | G06F 11/3013 455/411 |
| 2012/0252577 A1* | 10/2012 | Webster | A63F 13/92 463/31 |
| 2013/0110974 A1* | 5/2013 | Arrasvuori | H04L 67/18 709/217 |
| 2013/0111370 A1* | 5/2013 | Pasquero | H04W 4/21 715/761 |

OTHER PUBLICATIONS

Ballendat, Till, et al., "Proxemic Interaction: Designing for a Proximity and Orientation-Aware Environment," ITS'10, Nov. 7-10, 2010, 10 pages.

Rekimoto, Jun, et al., "Proximal Interactions: A Direct Manipulation Technique for Wireless Networking," Proceedings of INTERACT 2003, 2003, 8 pages.

"TransferJet—Worlds are About to Touch", TransferJet Overview Whitepaper, Spring 2009, pp. 1-10.

"TransferJet—TransferJet Overview—Concept and Technology", TransferJet Consortium, Feb. 2010, pp. 1-41.

* cited by examiner

PERFORMING DEVICE COMMUNICATIONS BASED ON RELATIVE POSITIONING

BACKGROUND

Various protocols for communicating among devices have been developed for the purpose of transferring content, allowing device interoperability, and/or the like. Some such protocols utilize pairing or other handshaking mechanisms to initialize a connection between devices, after which content can be transferred, or other device-to-device communications can occur. Initiation of the connection and subsequent actions over the connection involve manual configuration and/or interaction on at least one of the devices. In addition, mechanisms exist for determining location, position, and/or similar physical properties of a device.

SUMMARY

Some example embodiments may provide a method for initiating actions among devices. The method can include determining a relative position of at least one device to at least one other device, obtaining one or more rules specifying at least one action to initiate based at least in part on the relative position of the at least one device to the at least one other device, and initiating the at least one action using a processor of the at least one device.

Additional aspects relate to a system for initiating actions among devices. The system can include a position determining module for determining a relative position of at least one device to at least one other device, a rules database for storing one or more rules specifying at least one action to initiate based at least in part on the relative position of the at least one device to the at least one other device, and a rules processing module for obtaining the one or more rules and initiating the at least one action on the at least one device.

Other aspects relate to a computer program product comprising a computer-readable storage medium having computer-executable program code instructions stored therein. The computer-executable program code instructions include program code instructions for determining a relative position of at least one device to at least one other device, obtaining one or more rules specifying at least one action to initiate based at least in part on the relative position of the at least one device to the at least one other device, and initiating the at least one action using a processor of the at least one device.

BRIEF DESCRIPTION OF THE SEVERAL VIEWS OF THE DRAWINGS

Having thus described example subject matter in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Device connectivity and interoperability are used in many facets to share content among devices, leverage functionality of one or more devices for use by one or more other devices, and/or the like. Initiating communications between such devices often includes a pairing procedure that is manually performed on at least one of the devices, as is initializing subsequent processes over a communication link between devices. Aspects described herein relate to initiating actions among devices based at least in part on determining positioning of the devices relative to one another. For example, a device placed on one side of another device may cause transfer of certain types of files from the device to the other device, whereas placing the device on another side of the other device may cause transfer of other types of files from the device to the other device or other actions.

Positioning of a device with respect to another device can be determined using various technologies, which may include technologies operating remotely to the devices (e.g., a network component to which the devices are connected determining or otherwise receiving location information for the devices), technologies within the devices themselves (e.g., one or more proximity sensors to detect relative position of the devices), etc. For example, some location mechanisms allow for determining location of devices communicating with an access point indoors (e.g., a WiFi access point), taking location of walls and other structures into account, and such technologies can be used to determine relative positioning of devices. Moreover, other factors can be analyzed to determine action initiation as well, such as an orientation of one or more of the devices (e.g., a directionality of the device, whether the device is face-up, face-down, etc.), actual location of the devices (e.g., home or office), and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
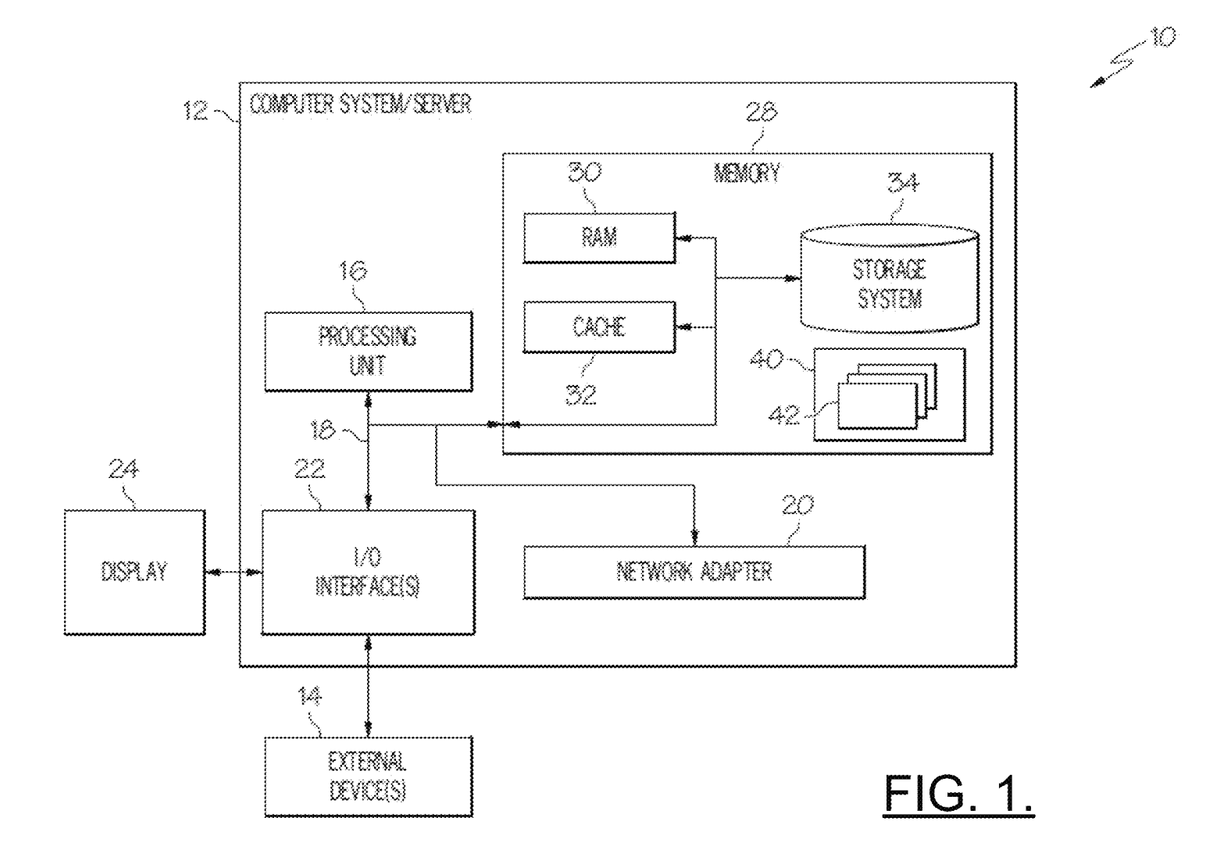
FIG. 1 depicts a cloud computing node according to an embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
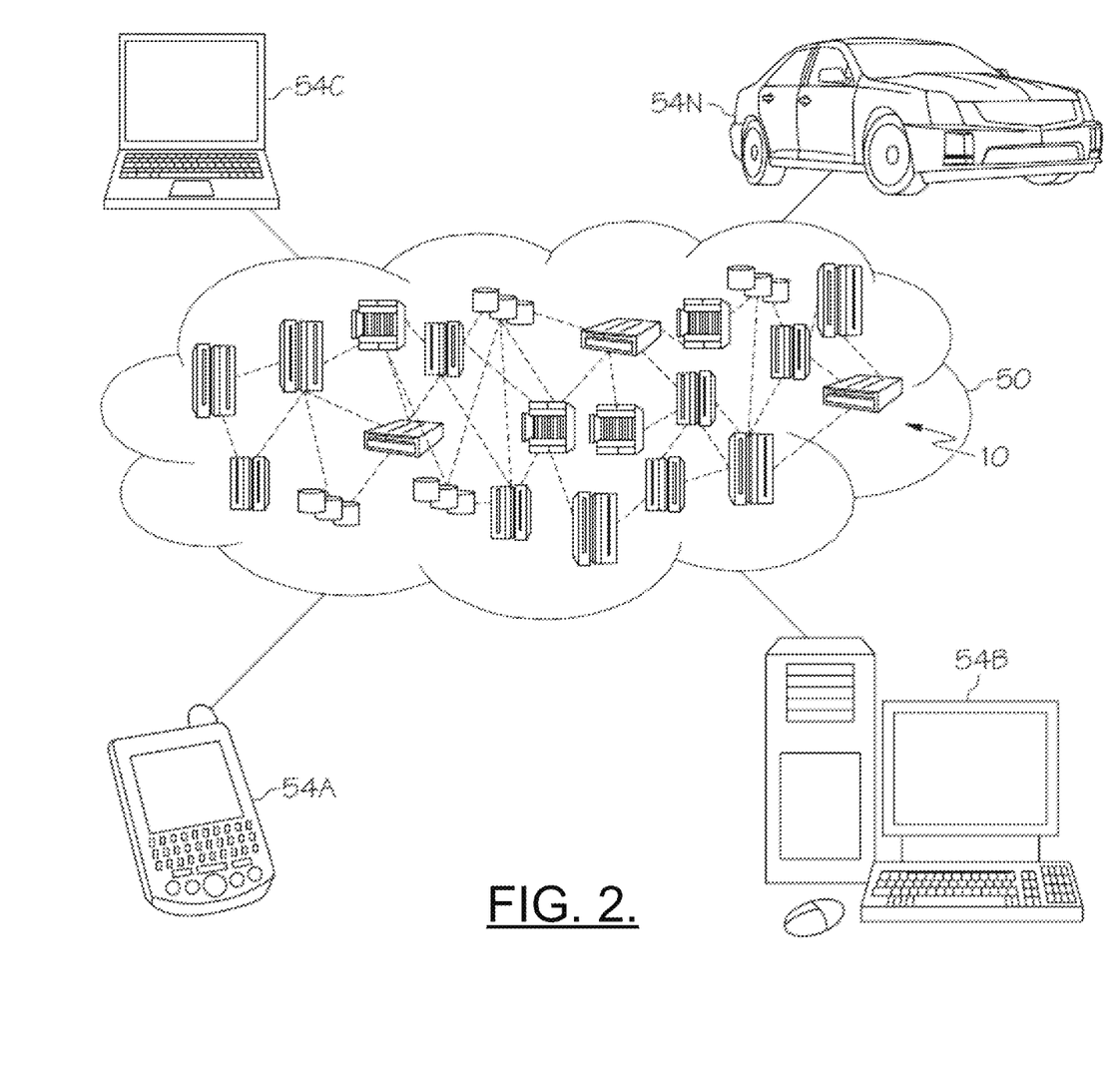
FIG. 2 depicts a cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
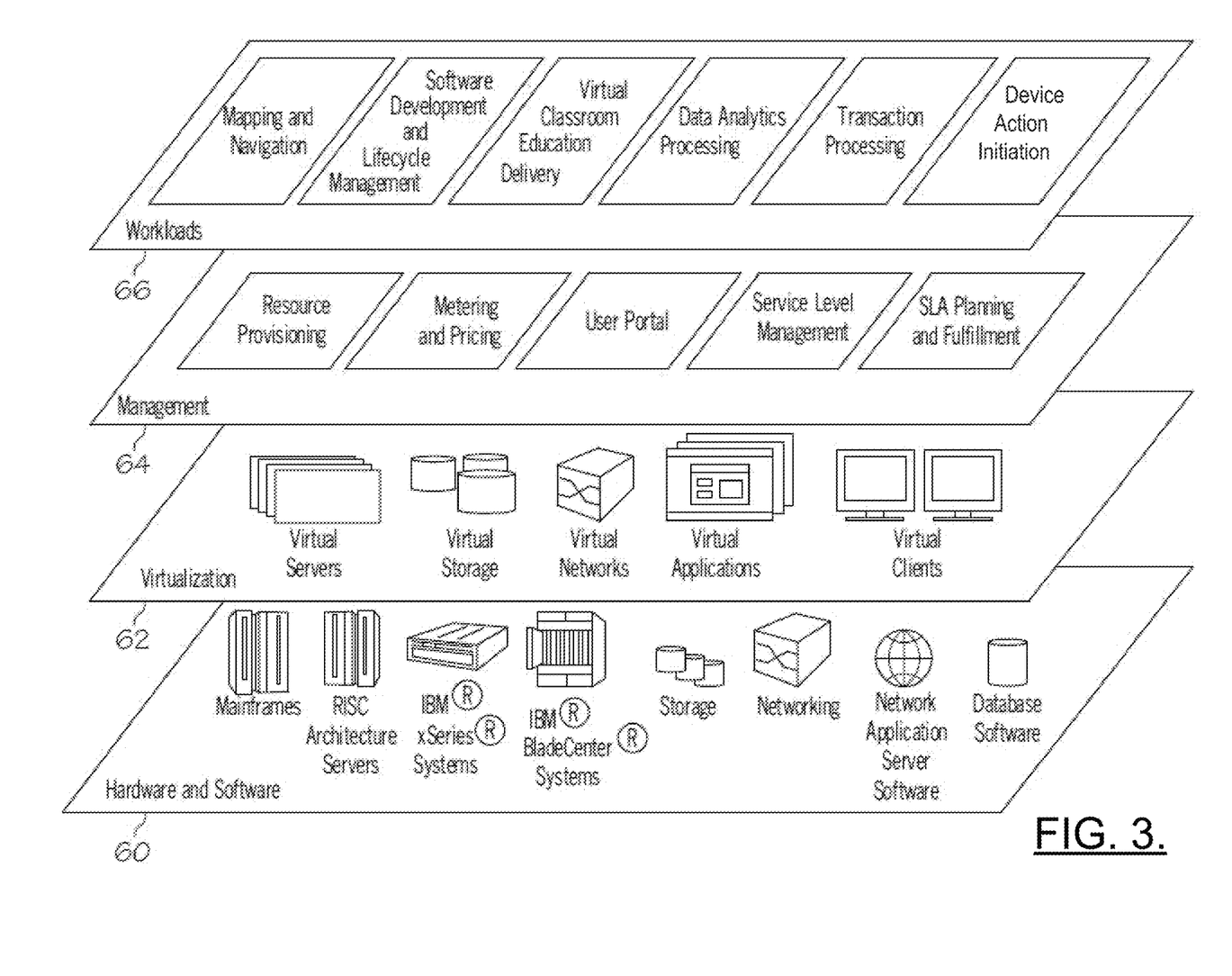
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and device action initiation. As described herein, device action initiation can occur based on a relative position of a plurality of devices, orientation of the devices, location of the devices, relationships between owners of the devices, user interface (UI) interactions, etc.

Figure 4:
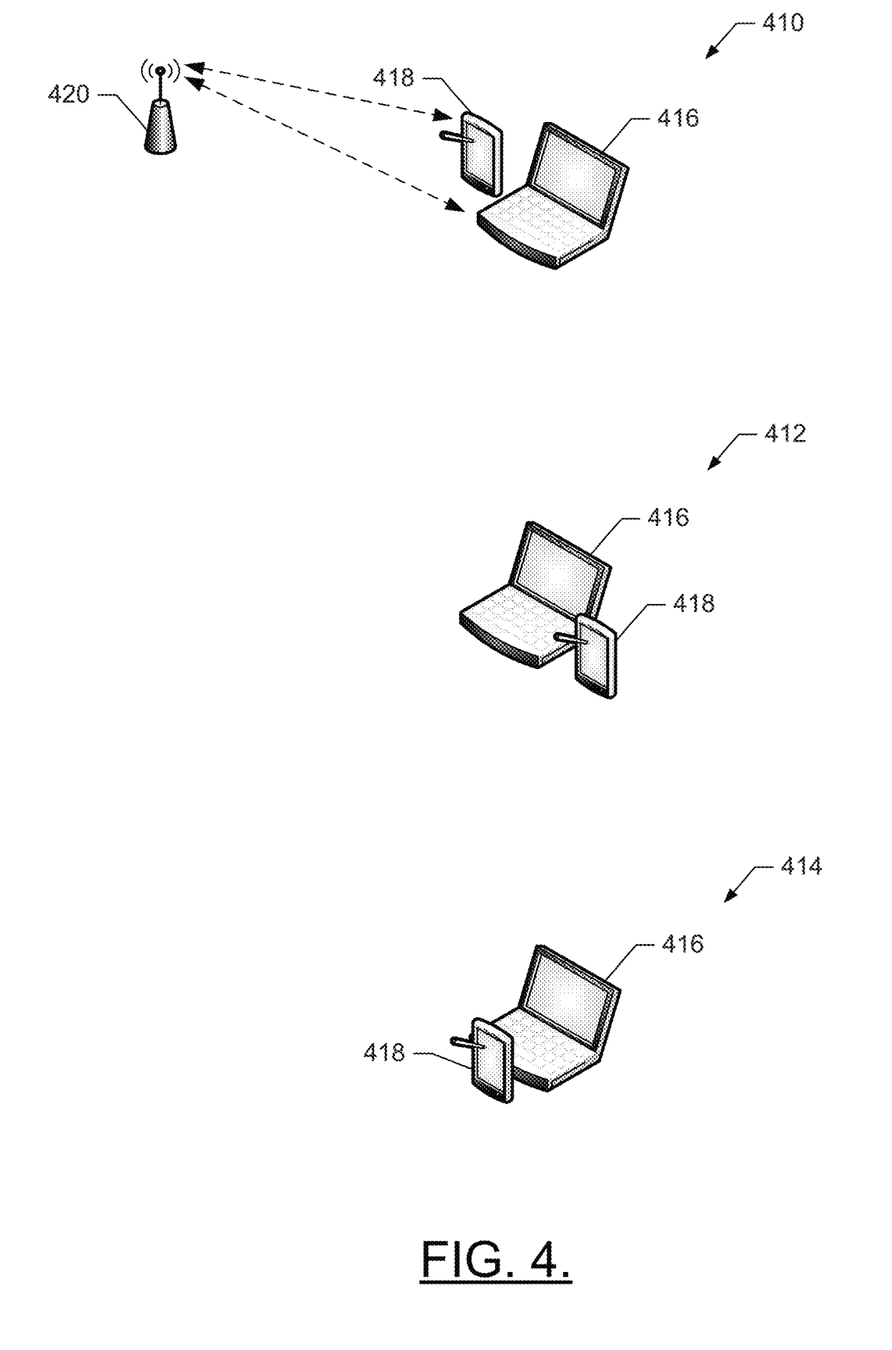
FIG. 4 depicts example systems of devices at different relative positions to one another.

FIG. 4 illustrates example systems 410, 412, and 414 for initiating actions related to one or more devices based at least in part on a relative position of a device to another device. Systems 410, 412, and 414 include a device 416 and a device 418 that can communicate with one another and/or perform other actions with respect to one another based at least in part on a relative position of device 418 to device 416 (and/or vice versa). For example, actions can be initiated by or on device 418 and/or device 416 based at least in part on relative position of device 418 with respect to device 416. Devices 416 and 418 can each include a computer, a network access terminal, a personal digital assistant (PDA), cellular phone, smart phone, tablet, and/or similar devices able to communicate with one another using a wireless technology.

As shown, in system 410, device 418 is positioned to the left side of device 416. Proximity of the device 418 to device 416, and its relative position as being on the left side of device 416, can be detected. Device 418 and/or device 416 can initiate an action based at least in part on detecting the proximity of device 418 to device 416 and/or relative position of device 418 to device 416. System 412 includes device 418 positioned to the right of device 416. In this system 412, proximity of device 418 to device 416 and/or relative position of device 418 as being to the right of device 416 is detected, and one or more of the devices 416 and 418 can accordingly initiate a different action based at least in part on the relative position. Moreover, in system 414, device 418 is positioned in front of device 416, and detecting such relative positioning between the devices 416 and 418 can cause initiation of other different actions, for example.

Proximity and/or relative positioning of the devices 416 and 418 can be determined by a remote device communicating with the devices 416 and 418, such as an access point 420 as shown in system 410, a global positioning system (GPS) receiver in the devices 416 and 418 obtaining location coordinates and computing relative positioning of the device 416 and 418, etc. In other examples, proximity and/or relative positioning of the devices 416 and 418 can be determined by the devices themselves, such as by receiving positioning information from the access point 420 and determining relative positioning thereof, receiving location information from a GPS receiver and determining relative positioning thereof, using one or more proximity sensors or other peer-to-peer communication technologies to determine relative positioning of a nearby device, etc. For example, the devices 416 and/or 418 can include one or more sensors to determine which sensors positioned on the devices 416 and/or 418 have the highest signal strength for communications from the other device, and this can indicate the relative position of the other device.

In any case, once the relative position of devices 416 and 418 is determined (e.g., by device 416 and/or 418, or otherwise indicated to the device 416 and/or 418), at least one of the devices 416 or 418 can initiate an action. For example, the device 416 or 418 can obtain one or more rules specifying an action to perform based on determining the relative position of device 418 to device 416 (and/or vice versa), and the device 416 or 418 can perform the action. For example, the actions can include initiating a pairing process or other handshake to begin file transfer or other interaction among the devices 416 or 418, transferring files or other data among the devices 416 or 418, leveraging functionality of one device from the other device (e.g., using an audio output capability of one device to stream audio from another device), performing authentication among the devices 416 or 418 to facilitate data transfer therebetween, and/or the like. Though two devices 416 and 418 are shown, it is to be appreciated that the described functionality can be provided for performing actions among more than two devices.

In additional examples, location of the devices 416 and 418 can be considered in determining the appropriate action (e.g., where the one or more rules can include an indication of location). For example, a device 418 placed to the right of device 416 at home may cause transfer of personal content, such as personal email, photos, music, etc., whereas device 418 placed to the right of device 416 or another device at work may cause transfer of work-related content, such as company email, documents, spreadsheets, presentations, etc. Moreover, an orientation of device 416 or 418 can be considered in determining the appropriate action as well (e.g., where the one or more rules can include an indication of orientation for one or more of the devices 416 or 418). For example, device 418 may be face-up or face-down, which may cause independent actions to be performed. In other examples, device 418 may be oriented in a landscape or portrait position relative to device 416, which can cause independent actions to be performed. Moreover, in some examples, device 418 may be pointing in a certain cardinal direction (respective to device 416 or otherwise), positioned at a coordinate on top of device 416 (e.g., upper-left corner, lower-right corner, etc.), and/or the like, which can be associated to respective rules to cause respective actions between devices 418 and 416. In any case, rules for performing actions can be defined for substantially any relative position and/or orientation of the device 418 with respect to device 416 (and/or vice versa), and the actions can be performed based at least in part on detecting the relative position, orientation, etc., determining the action based on a related rule, and performing the action on one or more of the devices 416 or 418.

Figure 5:
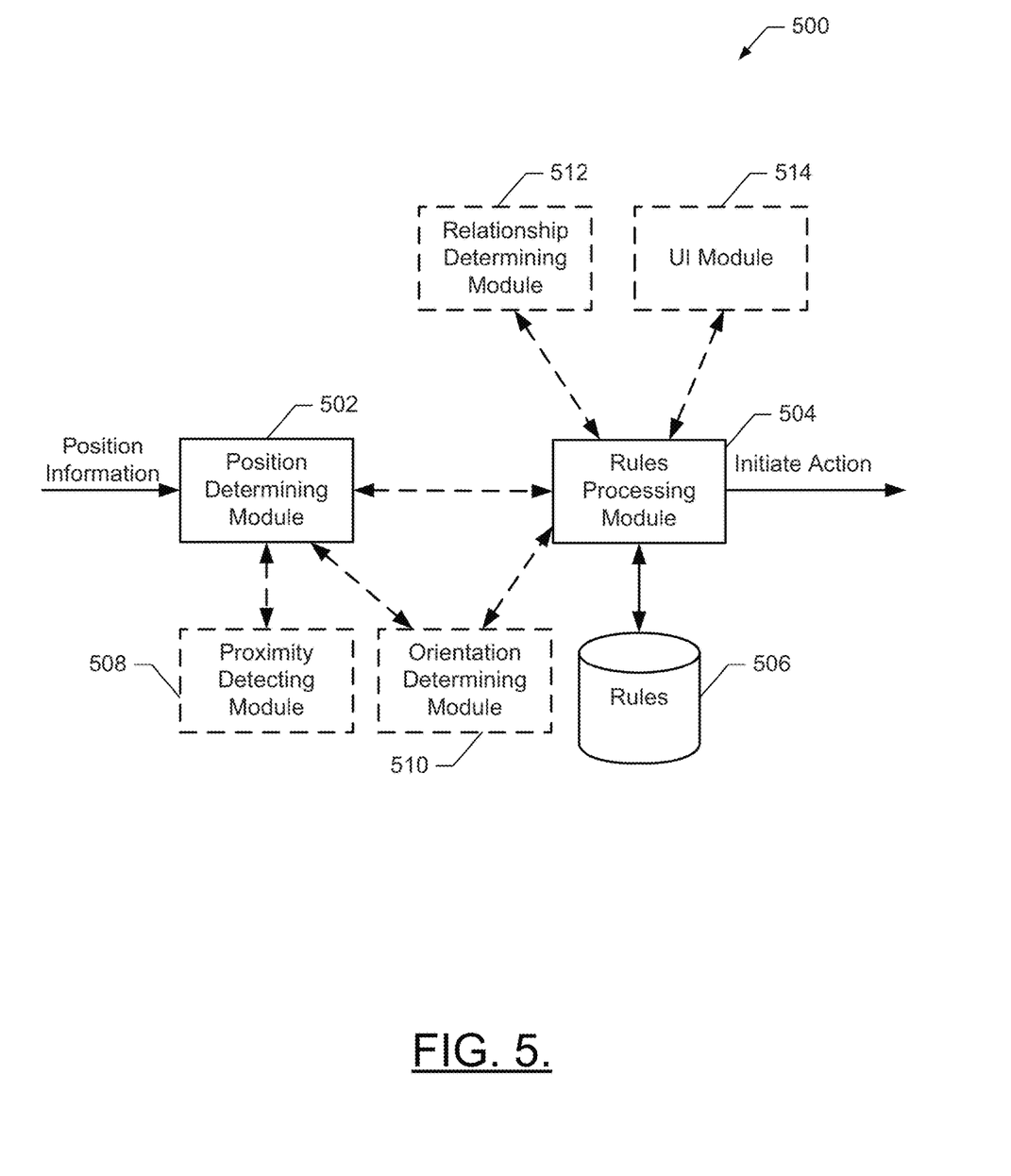
FIG. 5 depicts an example system for initiating actions among devices based at least on a relative position thereof.

FIG. 5 illustrates an example system 500 for performing actions based on determining positioning of one or more devices. System 500 includes a position determining module 502 for determining a relative position of at least one device with respect to at least one other device, and a rules processing module 504 for determining one or more rules from a rules database 506 corresponding to one or more actions to perform on the at least one device based on the relative position to the at least one other device. System 500 also optionally includes a proximity detecting module 508 for determining proximity of the at least one device to the at least one other device, and/or an orientation determining module 510 for obtaining an orientation of the at least one device for additional consideration by the rules processing module 504 in determining the one or more rules. In addition, system 500 can optionally include a relationship determining module 512 for determining a relationship between owners (e.g., or users) of the at least one device and the at least another device, and/or a UI module 514 for receiving input regarding configuring one or more rules in rules database 506, defining actions for rules processing component 504 to initiate, etc.

It is to be appreciated that the various modules 502, 504, 508, 510, 512, and/or 514 can be provided within one or more devices, within remotely located devices to which the one or more devices communicate, and/or the like, as described above. For example, an access point can provide the position determining module 502 that determines relative position of at least two devices with respect to one another, and provides corresponding position information to at least one of the devices. In another example, at least one device can provide the position determining module 502 to determine a position thereof with respect to at least one other device, which can be based on at least one of position information received from an access point with respect to the at least one device and the at least one other device, detecting the at least one other device at the at least on device based on input from one or more proximity sensors on the at least one device, and/or other mechanisms for receiving position information.

In an example, position determining module 502 obtains position information for at least one device from at least one of an access point or other remotely located device, one or more proximity sensors on a respective device, etc. For example, the position information can indicate the relative position of the at least one device to the at least one other device (e.g., to the right, left, in front, behind, on top of, underneath, within a specified distance, etc.). In one example, the position information includes information from which the relative position can be derived, such as location coordinates for the devices, a distance between the devices, a direction of the distance between the devices, location of sensors on the at least one device that detect presence of the at least one other device, and/or the like. In addition, the position information can identify the at least one other device and/or a type thereof.

Rules database 506 can store one or more rules that specify actions to be performed based on the determined relative location of the at least one device. For example, the one or more rules can include general rules for all devices, general rules for the at least one device at relative position to any other device, specific rules for the at least one device at a relative position to a specific identified other device and/or type of device, and/or the like. The one or more rules can specify actions such as initiating communications between the devices, transferring files from/to the at least one device, leveraging device functionalities of/by the at least one device, and/or the like, based at least in part on a relative position of the devices. Thus, in one example, once position determining module 502 determines a position of the at least one device with respect to at least one other device, the rules processing module 504, which may be present in the at least one device or can otherwise cause action by the at least one device, can determine one or more rules from the rules database 506 that correspond to the relative position of the at least one device with respect to the at least one other device, and can initiate an action on the at least one device as specified in the one or more rules. As described, in one example, the one or more rules can also be specific to the type of the at least one other device (e.g., the one or more rules can relate to actions performed when the at least one device is placed next to any tablet computer).

In another example, orientation determining module 510 can obtain orientation information of the at least one device and/or the at least one other device. For example, this can include whether the device is facing upward, facing downward, in portrait or landscape mode (e.g., with respect to the at least one other device or otherwise), pointing in a certain direction, etc. The orientation determining component 510, for example, can receive such information from an accelerometer or other component of the at least one device that detects orientation information, a camera installed on another device (e.g., and/or on the at least one other device) to detect orientation information of the at least one device based on optical recognition, one or more orientation sensors on the device (e.g., similar to or the same as proximity sensors) that detect orientation with respect to another device based on determining location of a portion of sensors on the at least one device receiving signals at a highest strength from the at least one other device as compared to other sensors on the at least one device, etc.

Moreover, in an example, proximity detecting module 508 can detect the at least one device is within proximity to the at least one other device. For example, the at least one device can include the proximity detecting module 508 (e.g., which can implement one or more proximity sensors or other communication components, such as Bluetooth, near field communication (NFC) or other such components) to detect when at least one other device is within range. In other examples, one or more remote components can provide proximity detecting module 508, such as an access point, that detects proximity of devices based on received signal strengths of the devices, reported signal strengths by the devices, reported location information (e.g., GPS coordinates) or other determination of distance, location, etc. In any case, proximity detecting module 508 can cause position determining module 502 to obtain the position information based at least in part on detecting the at least one device is within the proximity to the at least one other device, in this example.

In another example, the position information can also include a location of the at least one device, which may be used by rules processing component 504 in determining the one or more rules applied from rules database 506 in performing an action at the device. For example, position determining module 502 can receive the position information from the at least one device, or a device communicating therewith, and can include an indication of the location (e.g., home, work, etc.), which may be based on an indication by a user of the device, a selected profile, etc., location coordinates (e.g., GPS coordinates received from a GPS receiver of the at least one device), and/or the like. As described, the at least one device can perform different actions determined by rules processing module 504 based on location (e.g., transfer personal files when located at home, or business files when located at work, etc.).

In additional examples, rules database 506 can include one or more rules for the at least one device with respect to different owners of other devices to define content to share with devices of that different owner based on position of the at least one device relative to a device of that different owner (or vice versa). Thus, rules database 506 can include additionally modified rules for different positional placement of the at least one device respective to devices of the different owner (e.g., communicate certain playlists of music when the at least one device is to the left of the device of the different owner, and share certain photos when the at least one device is positioned to the right of the device of the different owner). In one example, the one or more rules may include authentication information to facilitate sharing the data with the devices owned by the different owner. The one or more rules can also relate to transferring certain tagged content (e.g., files, photos, or other data) based on a relationship between the owner of the at least one device and the different owner of the other device for transmitting to the device of the different owner.

Furthermore, in an example, relationship determining module 512 can determine a relationship between the owner of the at least one device and the owner of the other device. In one example, relationship determining module 512 can determine that the devices have the same owner (and/or can reserve determining relationship between owners for when the relationship determining module 512 initially determines that the devices have different owners). Where the devices have different owners, relationship determining module 512 can determine the relationship between the owners at least in part by examining social networking lists, contact lists, etc. of the owner of the at least one device to determine a relationship with the different owner. Rules processing module 506 can further use this information in determining one or more rules from rules database 506 and initiating the related action. In one example, the action can relate to the at least one device communicating photos to the other device where the photos include the different owner and/or common friends or contacts between the owner of the at least one device and the different owner.

In additional examples, UI module 514 can facilitate using a UI to facilitate performing one or more of the above actions. As shown, rules processing module 504 can use input from the UI module 514 in establishing rules for rules database 506, applying rules to initiate an action on the at least one device, etc. In an example, UI module 514 can initiate the action determined by the rules processing module 504, authenticate an owner of the at least one device on the other device for transferring content or otherwise performing actions therewith, select one of multiple devices in proximity with which to initiate the action, and/or the like, based on input received at UI module 514 (e.g., via confirmation button push, entry of credentials, device selection, etc.). In one example, where the at least one device is in proximity of multiple devices, the UI module 514 can list the nearby devices for selection thereof, or otherwise allow selection of other devices with which to initiate an action. In one specific example, the UI module 514 can interpret a gesture to indicate with which device to initiate the action (e.g., a gesture pointing in the direction of the other device, etc.). It is to be appreciated that the UI module 514 can also display status information of the action initiated between the devices, or provide display or selection of substantially any information to facilitate initiating of an action between devices, selection of devices for initiating the action, information for establishing one or more rules, as described herein, etc.

Additionally, in some examples, UI module 514 can configure one or more rules in rules database 506 based on received input. For instance, the at least one device can be placed in relative position to the other device, and UI module 514 can allow for indicating an action to initiate when the at least one device is in the relative position to the other device (e.g., specifically or generally for any other device). In this regard, rules processing module 504 can store one or more rules relating to performing the action upon position determining module 502 subsequently detecting the relative positioning between the at least one device and the other device. Moreover, the UI module 514 can allow for specifying the orientation of the at least one device that causes the action (e.g., the current or otherwise specified orientation), the location of the at least one device (e.g., the current or otherwise specified location), and/or the like, which can be included in the one or more rules. Moreover, for example, in addition or alternatively to allowing specifying of the action to be initiated, UI module 514 can record an action performed on the at least one device while in the relative position to the other device, orientation, location, etc., and can store the recorded action for performing when position determining module 502 subsequently detects the relative position, location, and/or orientation determining module 510 detects the orientation, etc.

In a specific example, position determining module 502 can receive position information from an access point (such as access point 420 in FIG. 4), which can compute a location of one or more devices (e.g., devices 416 and 418 in FIG. 4) communicating therewith based on measuring certain aspects of signals received from the devices 416 and 418, reports from the devices 416 and 418 of signals received from access point 420, known structures near devices 416 and 418, and/or the like. In this example, the access point 420, or another device communicating with devices 416 and 418, position determining module 502, etc., can determine that device 418 is positioned to the right of device 416 based at least in part on the computed locations of the devices 416 and 418. For example, the computed locations can be near one another such to detect proximity of the devices 416 and 418, and may be granular enough to detect that device 418 is positioned to the right of device 416. Position determining module 502 can provide the position information or further generated position information to rules processing module 504 for determining one or more rules to apply for initiating action on device 418 to communicate with device 416.

In another specific example, position determining module 502 can obtain the position information from one or more proximity sensors on device 418 that can determine position with respect to device 416 based on location of sensors having the highest quality communication or signal strength with device 416. For example, device 418 can have proximity sensors on multiple sides of the device 418, and the device 418 can determine sensors that are closest to device 416 based on communication quality with the device 416 or strength of signals thereof relative to the other sensors. Device 418 can accordingly determine the position information based on the location of the sensors closest to device 416.

In some specific examples of actions to be initiated on the device 418 can include transferring/synchronizing all data files with device 416 when device 418 is placed on top of device 416, transferring/synchronizing critical data files with device 416 when device 418 is placed in front of device 416, transferring/synchronizing photo and music files with device 416 when device 418 is placed to the left of device 416, transferring/synchronizing only music files with device 416 when device 418 is placed to the right of device 416, etc. Moreover, in an example, device 418 may initiate the foregoing actions when device 418 is face-up but not face-down (e.g., and/or other specified actions when device 418 is face-down). The one or more rules in rules database 506 can define the various behaviors, as described, and can be of various levels of granularity. In addition, one or more rules in rules database 506 can specify a priority with respect to the devices to which the rules relate. In this example, the at least one device can assign higher priority to some devices over others such that where the at least one device is in proximity of multiple devices and in a relative position defined in the rules with respect to both devices (e.g., between two devices for which rules are defined), the rule processing module 504 can apply the rule having the highest priority to initiate the action on the at least one device.

Figure 6:
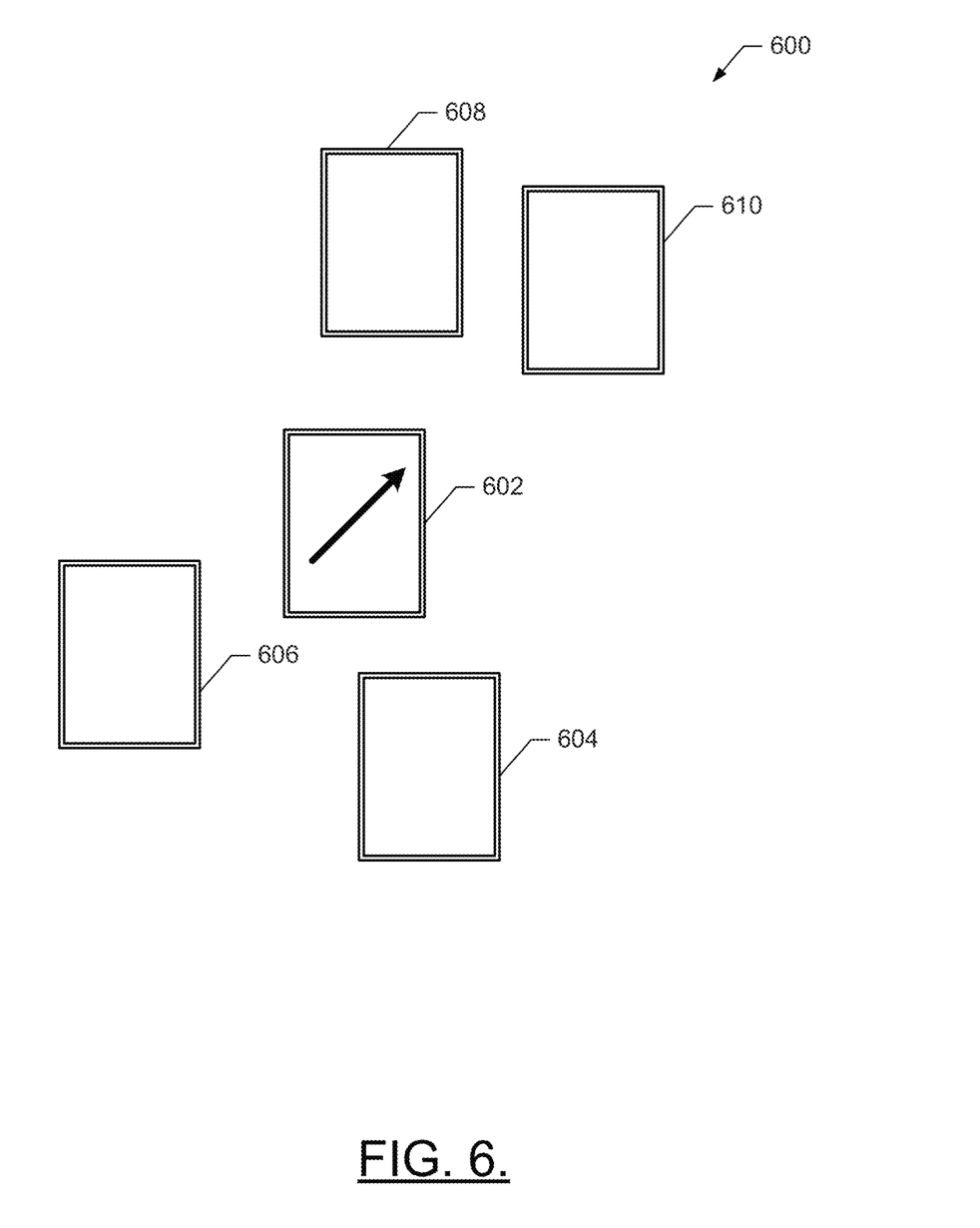
FIG. 6 depicts an example system for initiating actions among devices based at least on a relative position thereof and a selection of a device.

FIG. 6 illustrates an example system 600 for initiating actions among devices based on placement relative to one another. System 600 includes a plurality of devices 602, 604, 606, 608, and 610 positioned within proximity of one another. The devices 602, 604, 606, 608, and 610 can be equipped to allow initiation of actions based on relative position to one another, as described herein. Thus, for example, devices 602, 604, 606, 608, and 610 can each include, or have access to, the various modules described in FIG. 2 for determining relative position to other devices and processing rules based on the relative position to determine actions to initiate with the other devices. In this example, device 602 can be within proximity of surrounding devices 604, 606, 608, and 610, and may have rules defined for initiating actions with one or more of the devices 604, 606, 608, and 610. Device 602 can accordingly select one or more of the devices 604, 606, 608, and 610 with which to initiate the action (e.g., based on one or more rules specified related to the given device or type of device, one or more general rules for all devices, etc.).

Device 602, in the depicted example, selects device 610 for initiating the respective action. As shown, device 602 can select device 610 by drawing a gesture towards device 610 using an interface of device 602 (e.g., using a touch surface of a tablet, a mouse to move a cursor in the direction of device 610, etc.). In this example, a UI module 514 receives the gesture on the device 602, and rules processing module 504 can determine device 610 as having a relative position to device 602 in the direction of the gesture based on the relative position information of device 602 to device 610 (and/or devices 604, 606, and 608) received at and from position determining module 502. As described, in one example, a centrally located access point can provide the position information to position determining module 502 in each device 602, 604, 606, 608, and 610, such to track location of all devices communicating therewith. The position determining module 502 can provide the position information to rules processing module 504, which can be located at each device 602, 604, 606, 608, and 610, to determine rules for initiating actions based on relative position of the devices, as described. In other examples, as described, he access point can implement one or more of the position determining module 502, rules processing module 504, etc.

Certain aspects are described below with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An example method 700 according to one example embodiment will now be described in reference to FIG. 7. The method of FIG. 7 may be executed by various modules described herein. The method 700 may optionally include determining a location of at least one device at 702. This can include determining whether the at least one device is at home or work, in one example. The method 700 may optionally include determining a proximity of the at least one device to at least one other device at 704. This can occur via a remote component or based on information received therefrom, such as an access point, via one or more proximity sensors on one or more of the devices, etc. The method 700 may include determining a relative position of the at least one device to the at least one other device at 706. This can be based on determining the location at 702 and/or the proximity at 704, in one example. The relative position may indicate the at least one device is to the left of, right of, in front of behind, etc., the at least one other device. The method 700 may also optionally include determining a relationship between an owner of the at least one device and an owner of the at least one other device at 708. In one example, the owners of the at least one device and the at least one other device may be the same person. The method 700 may also optionally include determining a selection of the at least one other device at 710. This can be via a UI selection (e.g., using a gesture towards the at least one other device or other selection). The method 700 may include obtaining one or more rules specifying at least one action to initiate based at least in part on the relative position of the devices at 712. This can be further based on the location of the at least one device, the relationship between owners of the devices, the UI selection, etc. The method 700 may also include initiating the at least one action on the at least one device. As described, the action can relate to transferring files, leveraging functionality of the at least one other device, authenticating the devices for such actions, and/or the like.

Figure 7:
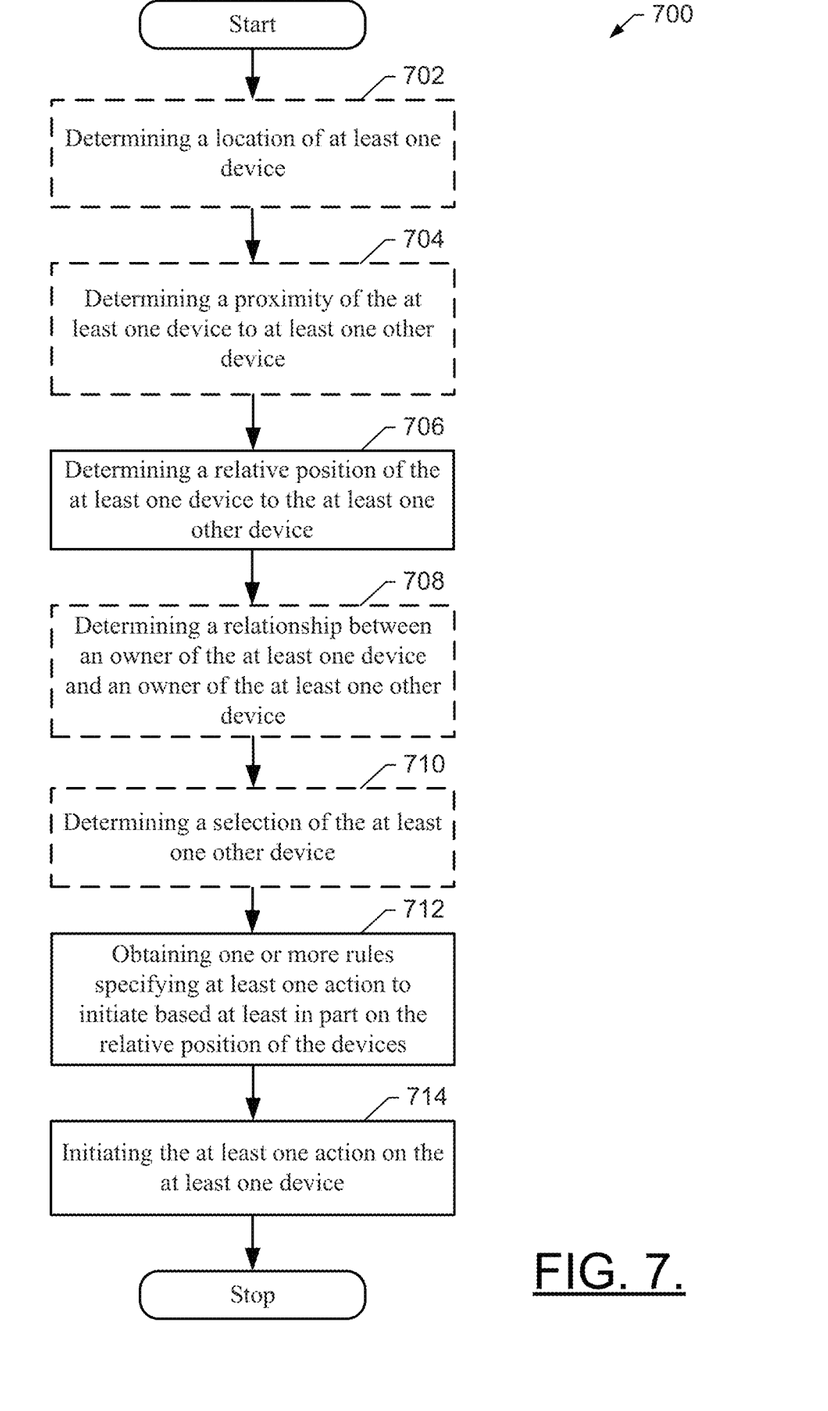
FIG. 7 illustrates a block diagram of an example method for initiating actions among devices based at least on a relative position thereof.

In an example embodiment, an apparatus for performing the method of FIG. 7 above may comprise a processor (e.g., the processing unit 16) configured to perform some or each of the operations described above. The processor may, for example, be configured to perform the operations by performing hardware implemented logical functions, executing stored instructions, executing algorithms for performing each of the operations, etc.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many modifications and other embodiments set forth herein will come to mind to one skilled in the art to which the described subject matter pertains having the benefit of the teachings presented in the foregoing descriptions and the associated drawings. Therefore, it is to be understood that the subject matter described herein is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method for initiating actions among devices, comprising:
   determining a relative position of at least one device to at least one other device;
   determining whether the at least one device and the at least one other device are both physically located together at a first location or at a second location;
   determining one or more rules from a rules database corresponding to one or more actions to perform on the at least one device based on the relative position to the at least one other device;

determining proximity of the at least one device to the at least one other device by detecting the at least one device is within the proximity to the at least one other device; and determining a relationship between owners of the at least one device and the at least one other device based on authentication information shared between the at least one device and the at least one other device, wherein the one or more rules implement transferring, in a first case, a first group of data files when the at least one device and the at least one other device are both located in the first location and the at least one device and the at least one other device have a first position relative to each other, and transferring, in a second case, a second group of data files, different than the first group of data files, when the at least one device and the at least one other device are both located in the second location, different than the first location, and the at least one device and the at least one other device have the same first position relative to each other as in the first case, wherein the first location is a home of at least one of the owners, and wherein the second location is a work location of at least one of the owners, wherein the first group of data files includes home-related content of at least one of the owners, and wherein the second group of data files includes work-related content of at least one of the owners, and wherein home-related content of the first group of data files and the work-related content of the second group of data files is determined by the determined relationship between the owners of the at least one device and the at least one other device and by a relative position between the at least one device and the at least one other device.

2. The method of claim 1, further comprising receiving input regarding configuring one or more rules in the rules database.

3. The method of claim 2, further comprising obtaining position information for the at least one device from an access point on the at least one device.

4. The method of claim 3, wherein the position information comprises at least one of: location coordinates for the at least one device to the at least one other device, a distance the at least one device to the at least one other device, a direction from the at least one device to the at least one other device, and location of sensors on the at least one device that detect presence of the at least one other device.

5. The method of claim 1, wherein the one or more rules comprises at least one of: initiating communications between the at least one device to the at least one other device, leveraging device functionalities of the at least one device by the at least one other device based at least in part on a relative position of the at least one device to the at least one other device.

6. The method of claim 1, further comprising obtaining an orientation of the at least one device.

7. The method of claim 6, wherein obtaining the orientation of the at least one device comprises determining the at least one device is facing upward, facing downward, in portrait or landscape mode, and pointing in a certain direction.

8. A system for initiating actions among devices, comprising:

a processor, a computer readable memory, and a hardware computer readable storage device;

program instructions stored in the hardware computer readable storage device for determining a relative position of at least one device to at least one other device;

program instructions stored in the hardware computer readable storage device for determining whether the at least one device and the at least one other device are both physically located together at a first location of an owner of the at least one device or the at least one other device, or at a second location;

program instructions stored in the hardware computer readable storage device for determining one or more rules from a rules database corresponding to one or more actions to perform on the at least one device based on the relative position to the at least one other device; and program instructions stored in the hardware computer readable storage device for determining proximity of the at least one device to the at least one other device, wherein the one or more rules implement transferring, in a first case, data files from the at least one device to the at least one other device, based, at least in part, on the relative position of the at least one device to the at least one other device, and on the at least one device and the at least one other device both being located in the first location, and transferring, in a second case, different data files, based, at least in part, on the relative position of the at least one device to the at least one other device being the same as in the first case, and based on the at least one device and the at least one other device both being in the second location, different from the first location, wherein the first location is a home of at least one of the owners, and wherein the second location is a work location of at least one of the owners, and wherein the data files includes home-related content of at least one of the owners, and wherein the different data files includes work-related content of at least one of the owners.

9. The system of claim 8, further comprising obtaining position information for the at least one device from proximity sensors on the at least one device, wherein the position information comprises location coordinates for the at least one device to the at least one other device, a distance the at least one device to the at least one other device, a direction from the at least one device to the at least one other device, and location of sensors on the at least one device that detect presence of the at least one other device.

10. A computer program product comprising a hardware computer-readable storage device having computer-executable program code instructions stored therein, the computer-executable program code instructions comprising program code instructions for:

determining a relative position of at least one device to at least one other device;

determining whether the at least one device and the at least one other device are both physically located together at a first location or at an second location;

determining one or more rules from a rules database corresponding to one or more actions to perform on the at least one device based on the relative position to the at least one other device;

determining proximity of the at least one device to the at least one other device;

obtaining an orientation of the at least one device;

initiating at least one action using a processor of the at least one device, wherein the one or more rules implement transferring, in a first case, a first group of data files when the at least one device and the at least one other device are both in a first location and the at least one device and the at least one other device have a first position relative to each other, and transferring, in a second case, a second group of data files, different than the first group of data files, when the at least one device and the at least one other device are both the second location, different than the first location, and the at least one device and the at least one other device have the same first position relative to each other as in the first case, wherein the first location is a home of at least one of the owners, and wherein the second location is a work location of at least one of the owners, wherein the first group of data files includes home-related content of at least one of the owners, and wherein the second group of data files includes work-related content of at least one of the owners, and wherein home-related content of the first group of data files and the work-related content of the second group of data files is determined by a relative position between the at least one device and the at least one other device.

11. The computer program product of claim 10, wherein the computer-executable program code instructions further comprise program code instructions for receiving input regarding configuring one or more rules in the rules database.

12. The method of claim 1, wherein the first position is selected from a group consisting of: the at least one device being located on a right side of the at least one other device; and the at least one device being located on a left side of the at least one other device.

13. The method of claim 1, wherein the first position is the at least one device being located face up relative to the at least one other device.

14. The method of claim 1, wherein the first position is selected from a group consisting of: the at least one device being located in a portrait position relative to the at least one other device; and the at least one device being located in a landscape position relative to the at least one other device.

15. The system of claim 8, further comprising program instructions for determining a relationship between owners of the at least one device and the at least one other device based on authentication information shared between the at least one device on the at least one other device.

16. The computer program product of claim 10, further comprising program code instructions for determining a relationship between owners of the at least one device and the at least one other device based on authentication information shared between the at least one device on the at least one other device.

17. The method of claim 1, further comprising obtaining an orientation of the at least one device, wherein:

obtaining the orientation of the at least one device comprises determining the at least one device is facing upward, facing downward, in portrait or landscape mode, and pointing in a certain direction;

the first group of data files are home-related data files of at least one of the owners, and the second group of data files are business data files of the at least one of the owners;

and the one or more rules comprises rules for initiating communications between the at least one device to the at least one other device, and for leveraging device functionalities of the at least one device by the at least one other device based at least in part on a relative position of the at least one device to the at least one other device.

18. The computer program product of claim 10, further comprising program code instructions for obtaining an orientation of the at least one device, wherein:

obtaining the orientation of the at least one device comprises determining the at least one device is facing upward, facing downward, in portrait or landscape mode, and pointing in a certain direction; and the one or more rules comprises rules for initiating communications between the at least one device to the at least one other device, and for leveraging device functionalities of the at least one device by the at least one other device based at least in part on a relative position of the at least one device to the at least one other device.

* * * * *